(12) United States Patent
Liu et al.

(10) Patent No.: US 8,749,106 B2
(45) Date of Patent: Jun. 10, 2014

(54) ELECTRIC MOTOR

(75) Inventors: Bao Ting Liu, Shenzhen (CN); Ji Cheng Pan, Shenzhen (CN); Ji Dong Chai, Shenzhen (CN); Xu Hai Wei, Shenzhen (CN)

(73) Assignee: Johnson Electric S.A., Murten (CH)

( * ) Notice: Subject to any disclaimer, the term of this patent is extended or adjusted under 35 U.S.C. 154(b) by 410 days.

(21) Appl. No.: 13/092,612

(22) Filed: Apr. 22, 2011

(65) Prior Publication Data

US 2011/0260569 A1   Oct. 27, 2011

(30) Foreign Application Priority Data

Apr. 23, 2010  (CN) .......................... 2010 1 0159635

(51) Int. Cl.
*H02K 3/00* (2006.01)
(52) U.S. Cl.
USPC .......................................... 310/198; 310/185
(58) Field of Classification Search
USPC ..................... 310/158, 198, 234, 184–186
See application file for complete search history.

(56) References Cited

U.S. PATENT DOCUMENTS

| | | | | |
|---|---|---|---|---|
| 3,733,506 A | * | 5/1973 | Jaffe et al. ...................... | 310/198 |
| 4,053,801 A | * | 10/1977 | Ray et al. ............... | 310/216.017 |
| 4,217,513 A | * | 8/1980 | Kohzai et al. .................. | 310/186 |
| 5,015,905 A | * | 5/1991 | Koharagi et al. ............. | 310/186 |
| 5,045,742 A | * | 9/1991 | Armstrong et al. .... | 310/216.069 |
| 5,087,845 A | * | 2/1992 | Behrens et al. ................. | 310/77 |
| 7,078,843 B2 | * | 7/2006 | Du et al. ................. | 310/216.091 |
| 7,557,484 B2 | * | 7/2009 | Kawashima et al. ......... | 310/225 |
| 2006/0244334 A1 | * | 11/2006 | Furui ............................ | 310/198 |

* cited by examiner

*Primary Examiner* — Dang Le
(74) *Attorney, Agent, or Firm* — Muncy, Geissler, Olds & Lowe, P.C.

(57) ABSTRACT

An electric motor has a stator and a rotor magnetically coupled to the stator. The rotor has a shaft, a rotor core fixed to the shaft and having a plurality of teeth, a commutator fixed to the shaft adjacent the rotor core and having a plurality of segments, and rotor winding units wound about the teeth and connected to the segments. Brushes arranged in sliding electrical contact with the commutator transfer power to the rotor. Each of the rotor winding units has at least two subcoils directly connected in series to each other and separated from each other by at least one tooth. An initial subcoil and a final subcoil of each rotor winding unit are respectively directly connected to two adjacent segments.

11 Claims, 5 Drawing Sheets

| bar | first subcoil | | second subcoil | | bar | first subcoil | | second subcoil | | bar |
|---|---|---|---|---|---|---|---|---|---|---|
| | slot in | slot out | slot in | slot out | | slot in | slot out | slot in | slot out | |
| Z1 | S5 | S1 | S6 | S2 | Z2 | S6 | S10 | S7 | S11 | Z3 |
| Z3 | S6 | S2 | S7 | S3 | Z4 | S7 | S11 | S8 | S12 | Z5 |
| Z5 | S7 | S3 | S8 | S4 | Z6 | S8 | S12 | S9 | S13 | Z7 |
| Z7 | S8 | S4 | S9 | S5 | Z8 | S9 | S13 | S10 | S14 | Z9 |
| Z9 | S9 | S5 | S10 | S6 | Z10 | S10 | S14 | S11 | S15 | Z11 |
| Z11 | S10 | S6 | S11 | S7 | Z12 | S11 | S15 | S12 | S16 | Z13 |
| Z13 | S11 | S7 | S12 | S8 | Z14 | S12 | S16 | S13 | S17 | Z15 |
| Z15 | S12 | S8 | S13 | S9 | Z16 | S13 | S17 | S14 | S18 | Z17 |
| Z17 | S13 | S9 | S14 | S10 | Z18 | S14 | S18 | S15 | S1 | Z19 |
| Z19 | S14 | S10 | S15 | S11 | Z20 | S15 | S1 | S16 | S2 | Z21 |
| Z21 | S15 | S11 | S16 | S12 | Z22 | S16 | S2 | S17 | S3 | Z23 |
| Z23 | S16 | S12 | S17 | S13 | Z24 | S17 | S3 | S18 | S4 | Z25 |
| Z25 | S17 | S13 | S18 | S14 | Z26 | S18 | S4 | S1 | S5 | Z27 |
| Z27 | S18 | S14 | S1 | S15 | Z28 | S1 | S5 | S2 | S6 | Z29 |
| Z29 | S1 | S15 | S2 | S16 | Z30 | S2 | S6 | S3 | S7 | Z31 |
| Z31 | S2 | S16 | S3 | S17 | Z32 | S3 | S7 | S4 | S8 | Z33 |
| Z33 | S3 | S17 | S4 | S18 | Z34 | S4 | S8 | S5 | S9 | Z35 |
| Z35 | S4 | S18 | S5 | S1 | Z36 | S5 | S9 | S6 | S10 | Z1 |

FIG. 4

ELECTRIC MOTOR

CROSS REFERENCE TO RELATED APPLICATIONS

This non-provisional patent application claims priority under 35 U.S.C. §119(a) from Patent Application No. 201010159635.8 filed in The People's Republic of China on Apr. 23, 2010.

FIELD OF THE INVENTION

This invention relates to an electric motor and in particular, to a wound rotor of an electric motor.

BACKGROUND OF THE INVENTION

A single phase series motor is also known as a universal motor as it can operate on either AC or DC power. It is a single phase motor with a wound stator and a wound rotor whose rotor windings are connected in series with stator windings via brushes. Due to its characteristics of high rotating speed, small size, low weight, high starting torque, convenient speed regulation and series excitation, the universal motor is commonly used for driving low power appliances that need a high rotating speed, small size and low weight, such as food mixers, vacuum cleaners, domestic sewing machines, power tools and so on.

Referring to FIG. 5 and FIG. 6, a typical known universal motor includes a rotor and a stator. The rotor has a shaft 22, a commutator (not shown) fixed on the shaft, a rotor core 24 which is fixed on the shaft adjacent the commutator and has a plurality of rotor poles 26, and rotor windings (not shown) which are wound about the rotor poles and connected to the commutator. The stator has a stator core 42 which includes a yoke with a rectangular configuration and two teeth 43 (stator poles) which extend inwardly from two opposing sides of the yoke and have stator windings 44 wound thereon. The motor also includes brushes (not shown) in sliding contact with the commutator to transmit electricity to the rotor windings. When the stator windings are electrified, two magnetic poles with opposite polarity are formed at the stator poles and two magnetic circuits are formed. Each magnetic circuit passes through the two stator poles, a half of the rotor and a side of the yoke so that it has a relatively long path, as shown in FIG. 6. Furthermore, both ends of each rotor winding are commonly connected to two segments of the commutator. Commutation performance of the motor is not good, especially when the number of turns of the rotor windings is relatively large.

Hence there is a desire for an improved electric motor.

SUMMARY OF THE INVENTION

Accordingly, in one aspect thereof, the present invention provides an electric motor comprising: a rotor having a shaft, a rotor core fixed to the shaft and having a plurality of teeth, a commutator fixed to the shaft adjacent the rotor core and having a plurality of segments, and rotor winding units wound about the teeth and connected to the segments; a stator magnetically coupled to the rotor; and brushes in sliding electrical contact with the commutator; wherein each of the rotor winding units comprises at least two subcoils directly connected in series to each other and separated from each other by at least one tooth, and an initial subcoil and a final subcoil of each rotor winding unit are directly connected to a pair of adjacent segments respectively.

Preferably, each of the rotor winding units comprises two subcoils directly connected in series to each other and separated from each other by one tooth.

Preferably, the at least two subcoils of a rotor winding unit have a same number of turns.

Alternatively, the at least two subcoils of a rotor winding unit have a different number of turns.

Preferably, the at least two subcoils of a rotor winding unit are wound in a same direction.

Preferably, two rotor winding units directly connected to a same segment are wound in opposite directions.

Preferably, the ratio of the number of segments to the number of teeth is 1, 2 or 3.

Preferably, the stator is configured to form 2P magnetic poles, the commutator has m segments, and the rotor core has n teeth wherein P is an integer greater than 1, m and n are even integers greater than P. Ideally, P equals to 2.

Preferably, the stator comprises a stator core having a yoke which comprises at least two first sections, each with a primary pole extended there from and at least two second sections each with a auxiliary pole extended there from, the at least two primary poles and the at least two auxiliary poles are alternately arranged in the circumferential direction of the stator core, and the primary poles have stator windings wound thereon; and the stator windings are configured in such a way that primary magnetic poles with the same polarity are formed at the at least two primary poles and induced magnetic poles with the same polarity which is opposite to the polarity of the primary magnetic poles are formed at the at least two auxiliary poles when the motor is electrified.

Preferably, the first sections are narrower than the second sections.

Preferably, there are no stator windings wound about the auxiliary poles.

Alternatively, the auxiliary poles have stator windings wound thereon, and the stator windings wound on the auxiliary poles have less turns than the stator windings wound on the primary poles.

Preferably, the ratio of an outer diameter of the rotor to a minimum outer dimension of the stator is greater than 7:10.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 4 is a table illustrating the winding pattern of FIG. 3;

DETAILED DESCRIPTION OF THE PREFERRED EMBODIMENT

Figure 1:
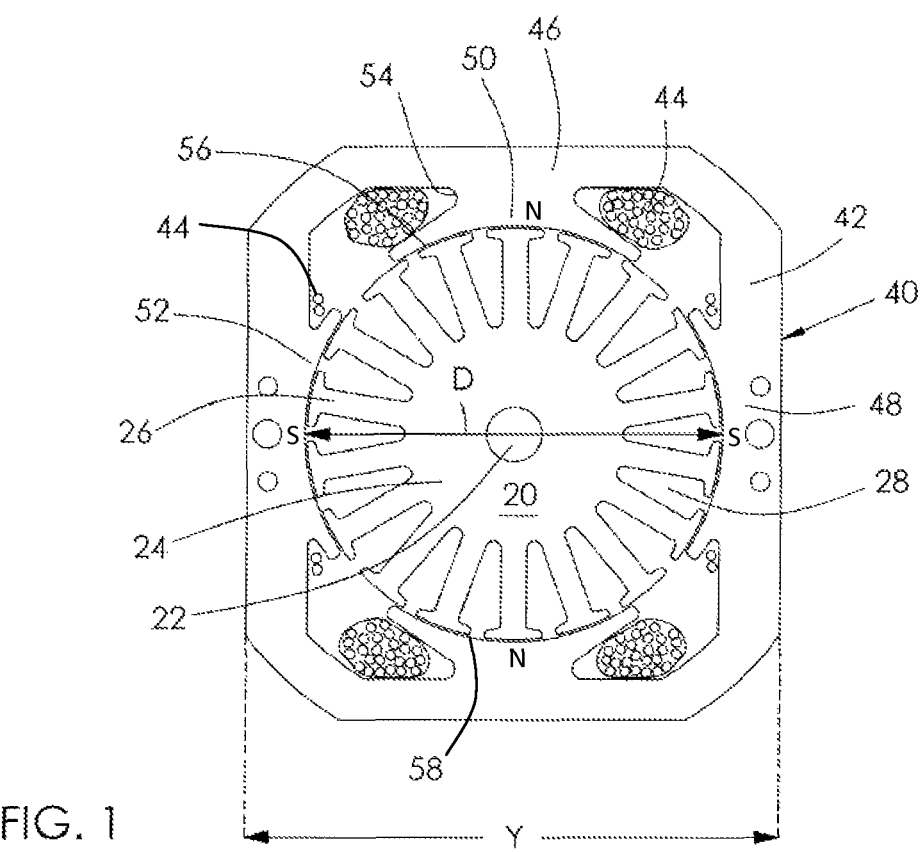
FIG. 1 is a schematic sectional view of an electric motor according to a preferred embodiment of the present invention.

A single phase series motor according to a preferred embodiment of the present invention is shown in FIG. 1. FIG.

1 is a schematic view of a cross section of the motor, with the rotor windings omitted. The motor comprises a rotor 20 and a stator 40 magnetically coupled to the rotor 20.

The rotor 20 comprises a shaft 22, a rotor core 24 fixed on the shaft 22, and a commutator (not shown) fixed on the shaft 22 adjacent the rotor core 24. The rotor core 24 is formed by stacking laminations in the axial direction of the rotor. The rotor core 24 has n teeth 26 and there are m rotor winding units 36 wound about the teeth 26. A winding slot 28 is formed between each two adjacent teeth 26. The commutator has m segments (also referred to as bars) 30. The rotor winding units 36 are wound in the winding slots 28 of the rotor core 24 and connected to the segments 30 of the commutator. In this embodiment, m equals to 36 and n equals to 18.

The stator 40 comprises a stator core 42 and stator windings 44. The stator core 42 is formed by stacking laminations in the axial direction of the motor and comprises a yoke with two first sections 46 and two second sections 48. The first sections 46 and second sections 48 are alternately arranged in the circumferential direction of the stator core 42. Two primary poles 50 and two auxiliary poles 52 extend inwardly from the first sections 46 and the second sections 48 respectively. The stator windings 44 are wound about the primary poles 50, and no windings are wound on the auxiliary poles 52. The motor also has four brushes 60 fixed with respect to the stator 40 to make sliding contact with the commutator to transfer electricity to the rotor winding units 36 via the commutator. The stator core 42 is symmetrical. The primary poles 50 and auxiliary poles 52 are salient poles and each comprise a neck 54 extending radially inwardly from the yoke and a pole shoe 56 extending circumferentially from the neck 54. Each pole shoe 56 forms a continuous arced surface (also known as pole face) 58 facing the rotor 20. Together, the pole shoes form an intermittent cylindrical wall.

In the circumferential direction, the necks of the primary poles 50 are narrower than the necks of the auxiliary poles 52. In the radial directions, the first sections 46 are narrower than the second sections 48, and the distance between the first sections 46 and the shoes 56 of the primary poles 50 are greater than the distance between the second sections 48 and the shoes 56 of the auxiliary poles 52. Thus, a larger space is formed between the first sections 46 and the primary poles 50 to accommodate the stator windings 44. It should be understood that the circumferential direction and the radial direction described above are not only for round or cylindrical structures, other shapes such as square and oval are also included within the scope of the present invention.

Figure 2:
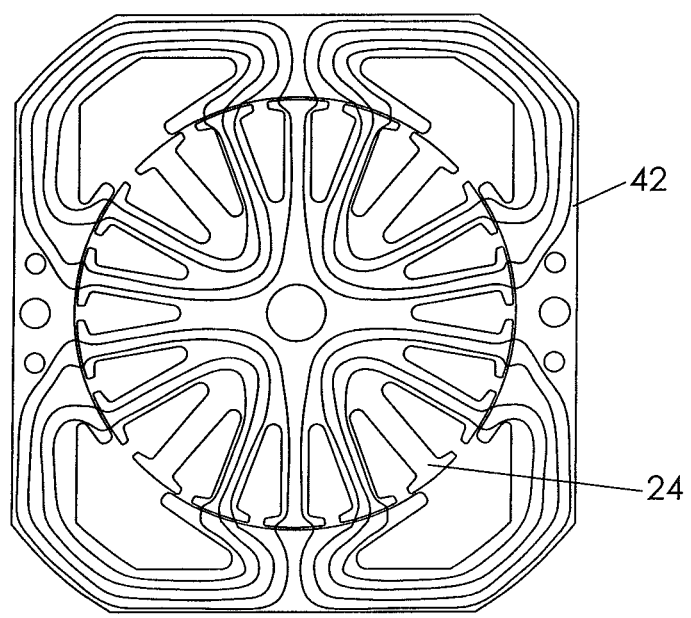
FIG. 2 is a magnetic path diagram for the motor of FIG. 1.

When the stator windings 44 are electrified, two primary magnetic poles with the same polarity (North shown in FIG. 1 for example) are formed at the pole faces 58 of the two primary poles 50 by the stator windings 44 and two induced magnetic poles with the same polarity (South shown in FIG. 1 for example) which is opposite to the polarity at the pole faces 58 of the primary magnetic poles are formed at the pole faces 58 of the two auxiliary poles 52. That is, four magnetic poles and four magnetic paths are formed, as shown in FIG. 2. Each magnetic path passes through a primary pole 50, the stator yoke, an auxiliary pole 52, the air gap between the auxiliary pole 52 and the rotor 20, the rotor 20 and the air gap between the primary pole 50 and the rotor 20.

In the embodiment, the rotor 20 has an outer diameter D, the stator 40 has a minimum outer dimension Y, and the ratio of the outer diameter D to the minimum outer dimension Y is greater than 7:10. The outer diameter of the rotor 20 means the outer diameter of the rotor core 24. The minimum outer dimension of the stator 40 means the distance between two intersection points between a straight line extending through the center of the stator 40 and the periphery of the stator core 42.

The outer diameter D of the rotor 20 is slightly less than the diameter of a circle defined by the arced surfaces of the pole shoes of the poles 50 and 52, and the ratio of the diameter of the circle to the minimum outer diameter of the rotor 20 is also greater than 7:10. It should be understandable that the distance between the primary poles 50 and the rotor core 42 may be equal to or different from the distance between the auxiliary poles 52 and the rotor core 42. When the two distances are different, the arced surfaces of the shoes of the primary poles 50 and the arced surfaces of the shoes of the auxiliary poles 52 define two circles with different diameters. In this configuration, the diameter of the circle means the diameter of the smaller circle.

In the preferred embodiment, the auxiliary poles 52 projects inwardly from the inner side of the second sections 48 so as to be formed as salient poles. Alternatively, the auxiliary poles 52 may be formed as non-salient poles which are sunk relative to the inner side of the second sections 48. When the auxiliary poles 52 are salient poles, as shown in FIG. 1, they may also have stator windings 44 wound thereon, and the stator windings 44 wound on the auxiliary poles 52 have less turns than the stator windings 44 wound on the primary poles 50.

The preferred winding pattern of the rotor winding units in the present invention will be generally described. To simplify the description, segments (or bars) 30 of the commutator are represented by Z1~Zm, winding slots 28 of the rotor core 24 are represent by S1~Sn, rotor winding units 36 of the rotor 20 are represented by W1~Wm, and the number of stator magnetic poles is 2P. Bar Zk is electrically connected with bar Z(k+1) via a rotor winding unit Wk, and bar Zm is electrically connected with bar Z1 via rotor winding unit Wm. Each winding unit Wi comprises a first subcoil Wia and a second subcoil Wib which is connected in series with the first subcoil Wia directly and is separated from the first subcoil Wia by at least one tooth. The first subcoil Wia and the second subcoil Wib are respectively connected to a pair of adjacent bars. Tooth number q is the number of teeth about which the coil is wound. Tooth number q of the first subcoil Wia equals the tooth number q of the second subcoil Wib. The tooth number q is an integer meeting the equation $|q-n/2P|<1$, wherein $n/2P$ is the pole pitch. In above description, P is an integer greater than 1, m and n are even numbers greater than P, $1 \leq k \leq m-1$, $1 \leq i \leq m$, and the ratio m to n may be 1, 2, or 3. Preferably, the ratio m to n is 2, and q is an integer less than $n/2P$.

Figure 3:
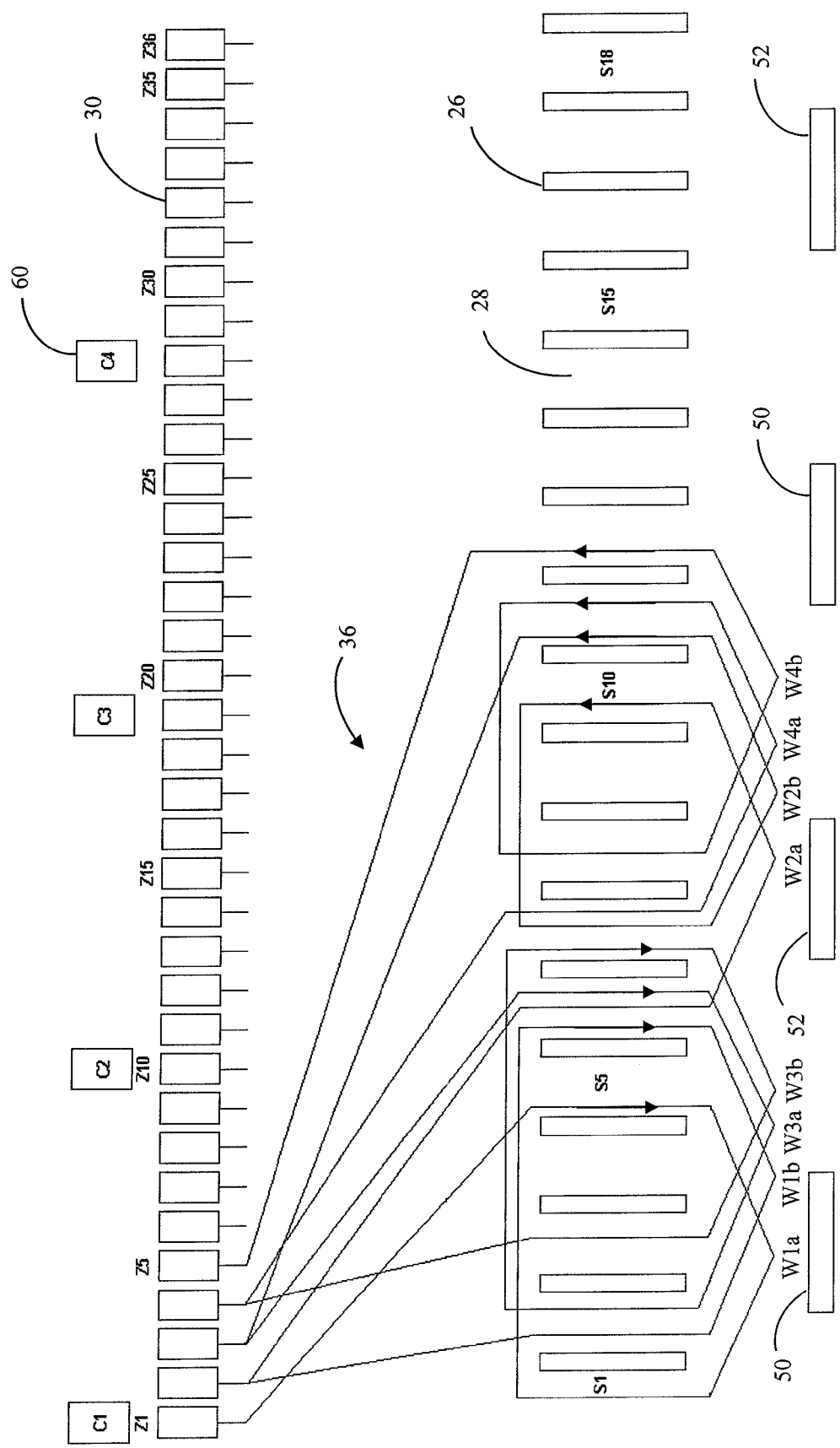
FIG. 3 shows a simplified winding pattern diagram for the motor of FIG. 1.
Figure 5:
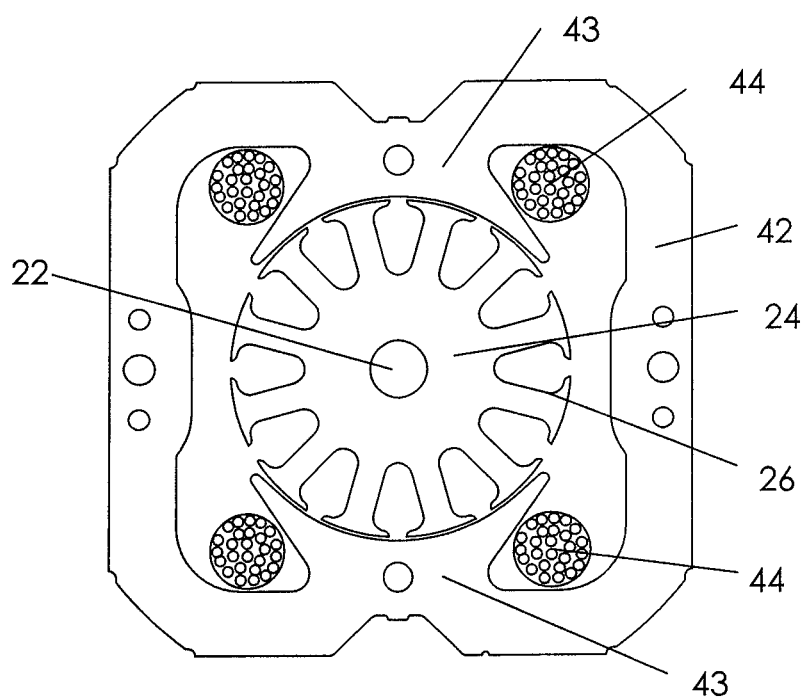
FIG. 5 is a schematic sectional view of a conventional universal motor.
Figure 6:
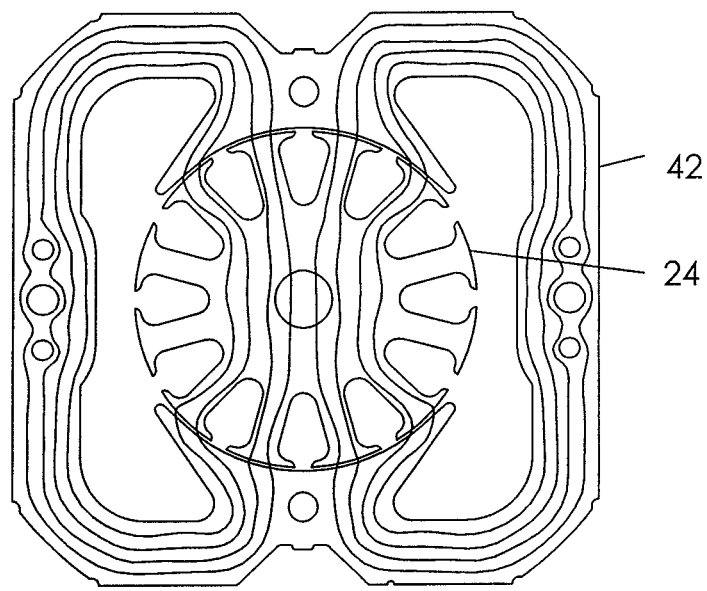
FIG. 6 is a magnetic path diagram for the motor of FIG. 5.

The winding pattern of the rotor winding units in the preferred embodiment will be now described in detail with reference to FIGS. 3 & 4. FIG. 3 is a winding diagram in which, the top row represents four brushes C1~C4 supported by the stator, the second row represents the thirty-six segments Z1~Z36 of the commutator, the third row represents the eighteen teeth of the rotor core and eighteen winding slots S1~S18 formed by the teeth, and the fourth row represents the four poles of the stator. FIG. 4 is a table listing the winding pattern of the rotor winding units in which, "slot in" mean a first winding slot that each subcoil of a rotor winding unit is wound in, and "slot out" means a second winding slot that the subcoil is wound in, viewed in the winding direction.

Bar Z1 is electrically connected with bar Z2 via a rotor winding unit W1. The rotor winding unit W1 has a first subcoil W1a and a second subcoil W1b which are directly connected in series to each other. The first subcoil W1a is wound about the teeth between the winding slots S5 and S1 and the second subcoil W1b is wound about the teeth between the winding slots S6 and S2. The first subcoil W1a has the same winding direction as the second subcoil W1b, both in clockwise direction as shown in FIG. 3 and both subcoil span four teeth.

Bar Z2 is electrically connected with bar Z3 via a rotor winding unit W2. The rotor winding unit W2 has a first subcoil W2a and a second subcoil W2b which are directly connected in series to each other. The first subcoil W2a is wound about the teeth between the winding slots S6 and S10 and the second subcoil W2b is wound about the teeth between the winding slots S7 and S11. The first subcoil W2 has the same winding direction as the second subcoil W2b, but opposite to the winding direction of the subcoils W1a and W1b of the winding unit W1.

Similar to the electrical connection of bar Z1 and Z2, bar Z3 is electrically connected with bar Z4 via a rotor winding unit W3. The rotor winding unit $W_3$ has a first subcoil W3a and a second subcoil W3b which are directly connected in series to each other. The first subcoil W3a is wound about the teeth between the winding slots S6 and S2 and the second subcoil W3b is wound about the teeth between the winding slots S7 and S3. Like the subcoils W1a and W1b, the subcoils W3a and W3b are also wound in clockwise direction.

Similar to the electrical connection of bar Z2 and Z3, bar Z4 is electrically connected with bar Z5 via a rotor winding unit $W_4$. The rotor winding unit $W_4$ has a first subcoil W4a and a second subcoil W4b which are directly connected in series to each other. The first subcoil W4a is wound about the teeth between the winding slots S7 and S11 and the second subcoil W4b is wound about the teeth between the winding slots S8 and S12. Like the subcoils W2a and W2b, the subcoils W4a and W4b are wound in counter-clockwise direction.

Other rotor winding units 36 of the rotor 20 are formed by repeating the process described above. That is, the two subcoils of a same rotor winding unit 36 are separated from each other by one tooth and wound in the same direction, two rotor winding units 36 directly connected to a same bar are wound in opposite directions, and the rotor winding unit W(j+2) is separated from the rotor winding unit Wj by one tooth, wherein 1≤j≤m−2.

In the conventional universal motor, each pair of commutator segments are connected to each other via a winding with a single subcoil, the induction electromotive force generated in the commutating coil is in direct proportion to the square of total number x of turns of the rotor winding unit. In the present invention, each pair of segments are connected to each other via a winding unit with two subcoils, the induction electromotive force generated in the commutating coil is in direct proportion to $(x_1^2+x_2^2)$, where $x_1$ and $x_2$ are the number of turns of the two subcoils respectively. Provided that x equals $(x_1+x_2)$, the induction electromotive force in the commutating coil in the present invention is smaller, therefore commutation performance can be improved and the life of the motor can be prolonged. Moreover, as two subcoils of each rotor winding unit connected to two segments are wound about more winding slots, the initial winding unbalance in the winding process can be optimized.

Furthermore, in embodiments of the present invention, as each flux circuit passes through adjacent primary stator pole and auxiliary stator pole, the flux path is reduced and optimized. Thus, the universal motor of the present invention may have a reduced stator core and windings material compared with a known universal motor with the same output, whereby saving cost.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the number of brushes of the motor is not limited to four. Each rotor winding unit may comprise more than two subcoils, and subcoils of a same rotor winding unit may have different number of turns.

The invention claimed is:

1. An electric motor comprising:
   a rotor having a shaft, a rotor core fixed to the shaft and having a plurality of teeth, a commutator fixed to the shaft adjacent the rotor core and having a plurality of segments, and rotor winding units wound about the teeth and connected to the segments; a stator magnetically coupled to the rotor; and
   brushes in sliding electrical contact with the commutator;
   wherein each of the rotor winding units comprises a first subcoil and a second subcoil directly connected in series to each other between a pair of adjacent segments and wound in the same direction around a first set of teeth and a second set of teeth, respectively;
   wherein the first set of teeth and the second set of teeth are offset from each other by exactly one tooth; and
   wherein two rotor winding units directly connected to a common segment are wound in opposite directions.

2. The motor of claim 1, wherein the first subcoil and the second subcoil of a rotor winding unit have a same number of turns.

3. The motor of claim 1, wherein the first subcoil and the second subcoil of a rotor winding unit have a different number of turns.

4. The motor of claim 1, wherein the ratio of the number of segments to the number of teeth is 1, 2 or 3.

5. The motor of claim 1, wherein the stator is configured to form 2P magnetic poles, the commutator has m segments, and the rotor core has n teeth wherein P is an integer greater than 1, m and n are even integers greater than P.

6. The motor of claim 5, wherein P equals to 2.

7. The motor of claim 1, wherein the stator comprises a stator core having a yoke which comprises at least two first sections, each with a primary pole extended there from and at least two second sections each with an auxiliary pole extended there from, the at least two primary poles and the at least two auxiliary poles are alternately arranged in the circumferential direction of the stator core, each of the primary poles and the auxiliary poles having a pole face facing the rotor, and the primary poles have stator windings wound thereon;
   wherein the stator windings are configured in such a way that primary magnetic poles with the same a first polarity are formed at the pole faces of the at least two primary poles and induced magnetic poles with a second polarity which is opposite to the first polarity are formed at the pole faces of the at least two auxiliary poles when the motor is electrified.

8. The motor of claim 7, wherein the ratio of an outer diameter of the rotor to a minimum outer dimension of the stator is greater than 7:10.

9. The motor of claim 7, wherein the first sections are narrower than the second sections.

10. The motor of claim 7, wherein there are no stator windings wound about the auxiliary poles.

11. The motor of claim 7, wherein the auxiliary poles have stator windings wound thereon, and the stator windings wound on the auxiliary poles have less turns than the stator windings wound on the primary poles.

\* \* \* \* \*